US008571371B2

(12) United States Patent
Gibson et al.

(10) Patent No.: US 8,571,371 B2
(45) Date of Patent: Oct. 29, 2013

(54) DIRECT EXTRUSION METHOD FOR THE FABRICATION OF PHOTONIC BAND GAP (PBG) FIBERS AND FIBER PREFORMS

(75) Inventors: Daniel J. Gibson, Cheverly, MD (US); Jasbinder S. Sanghera, Ashburn, VA (US); Frederic H. Kung, Alexandria, VA (US); Pablo C Pureza, Burke, VA (US); Robert E Miklos, La Plata, MD (US); Guillermo R. Villalobos, Springfield, VA (US); Leslie Brandon Shaw, Woodbridge, VA (US); Ishwar D. Aggarwal, Charlotte, NC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 307 days.

(21) Appl. No.: 13/160,760

(22) Filed: Jun. 15, 2011

(65) Prior Publication Data
US 2012/0321263 A1 Dec. 20, 2012

(51) Int. Cl.
*G02B 6/032* (2006.01)

(52) U.S. Cl.
USPC .......................................................... 385/125

(58) Field of Classification Search
None
See application file for complete search history.

(56) References Cited

U.S. PATENT DOCUMENTS

| 4,902,216 A | 2/1990 | Cunningham et al. |
| 5,774,779 A | 6/1998 | Tachinskiy |
| 6,260,388 B1 | 7/2001 | Borrelli et al. |
| 6,496,632 B2 | 12/2002 | Borrelli et al. |
| 6,847,771 B2 * | 1/2005 | Fajardo et al. ................. 385/125 |
| 6,993,230 B2 * | 1/2006 | Sanghera et al. ............. 385/125 |
| 7,077,900 B2 | 7/2006 | Park |
| 7,082,242 B2 | 7/2006 | Fajardo et al. |
| 7,295,740 B2 * | 11/2007 | Sanghera et al. ............. 385/125 |
| 7,330,634 B2 | 2/2008 | Aitkea et al. |
| 7,636,505 B2 | 12/2009 | Tassone |
| 7,873,251 B2 * | 1/2011 | Bayya et al. .................. 385/125 |
| 8,449,283 B2 * | 5/2013 | Currie et al. .................. 425/197 |
| 2003/0230118 A1 | 12/2003 | Dawes et al. |
| 2003/0231846 A1 | 12/2003 | Fajardo et al. |
| 2005/0074215 A1 | 4/2005 | Sanghera et al. |
| 2006/0230792 A1 | 10/2006 | Sanghera et al. |
| 2008/0060387 A1 | 3/2008 | Jasbinder et al. |
| 2009/0220633 A1 | 9/2009 | Despa et al. |
| 2009/0220785 A1 * | 9/2009 | Monro et al. ................. 428/397 |
| 2010/0303429 A1 | 12/2010 | Gibson et al. |
| 2010/0316856 A1 * | 12/2010 | Currie et al. .................. 428/213 |

OTHER PUBLICATIONS

Cregan, R.F., et al., "Single-Mode Photonic Band Gap Guidance of Light in Air", Science, vol. 285, pp. 1537-1539 (1999).
Barkou, S., et al., "Silica-Air Phtonic Crystal Fiber Design That Permits Waveguiding by a True Photonic Bandgap Effect", Optics Letters, vol. 24, No. 1, pp. 46-48 (1999).
Venkataraman, N., et al., "Low Loss (13 dB/km) Air Core Photonic Band-Gap Fibre", ECOC, Postdeadline Paper PD1.1, Sep. 2002.

* cited by examiner

*Primary Examiner* — Sung Pak
(74) *Attorney, Agent, or Firm* — US Naval Research Laboratory; Suresh Koshy

(57) ABSTRACT

A method and apparatus for making a substantially void-free preform for a microstructured optical fiber using a one-step process is provided. A preform is prepared from specialty glasses using a direct extrusion method. A die for use with the direct extrusion method is also provided, and a method for drawing the preform into a HC-PBG fiber for use in transmitting infra-red wavelength light is also provided. The preform comprises an outer jacket made of solid glass, a cladding having a plurality of air holes arranged in a desired pattern within the jacket, and a core which is hollow.

11 Claims, 8 Drawing Sheets

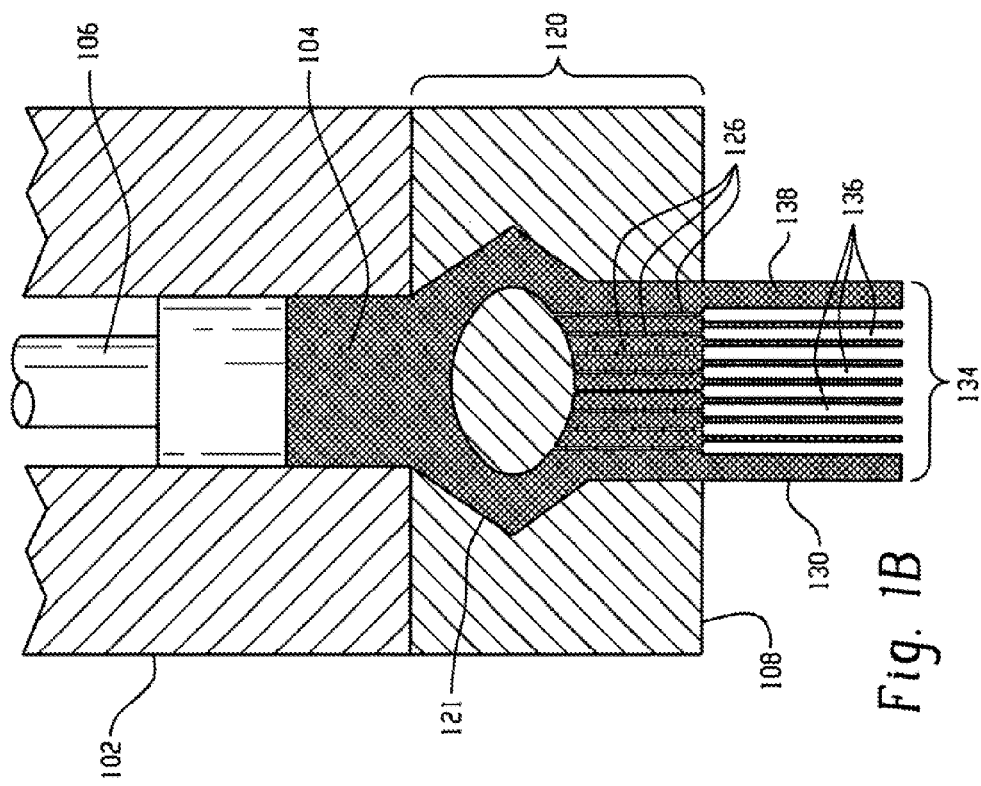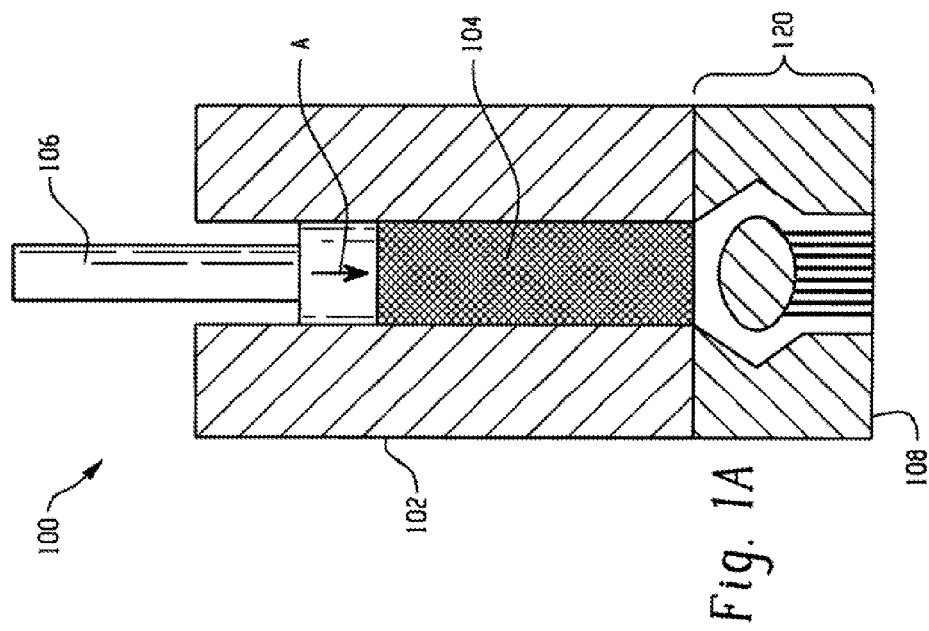

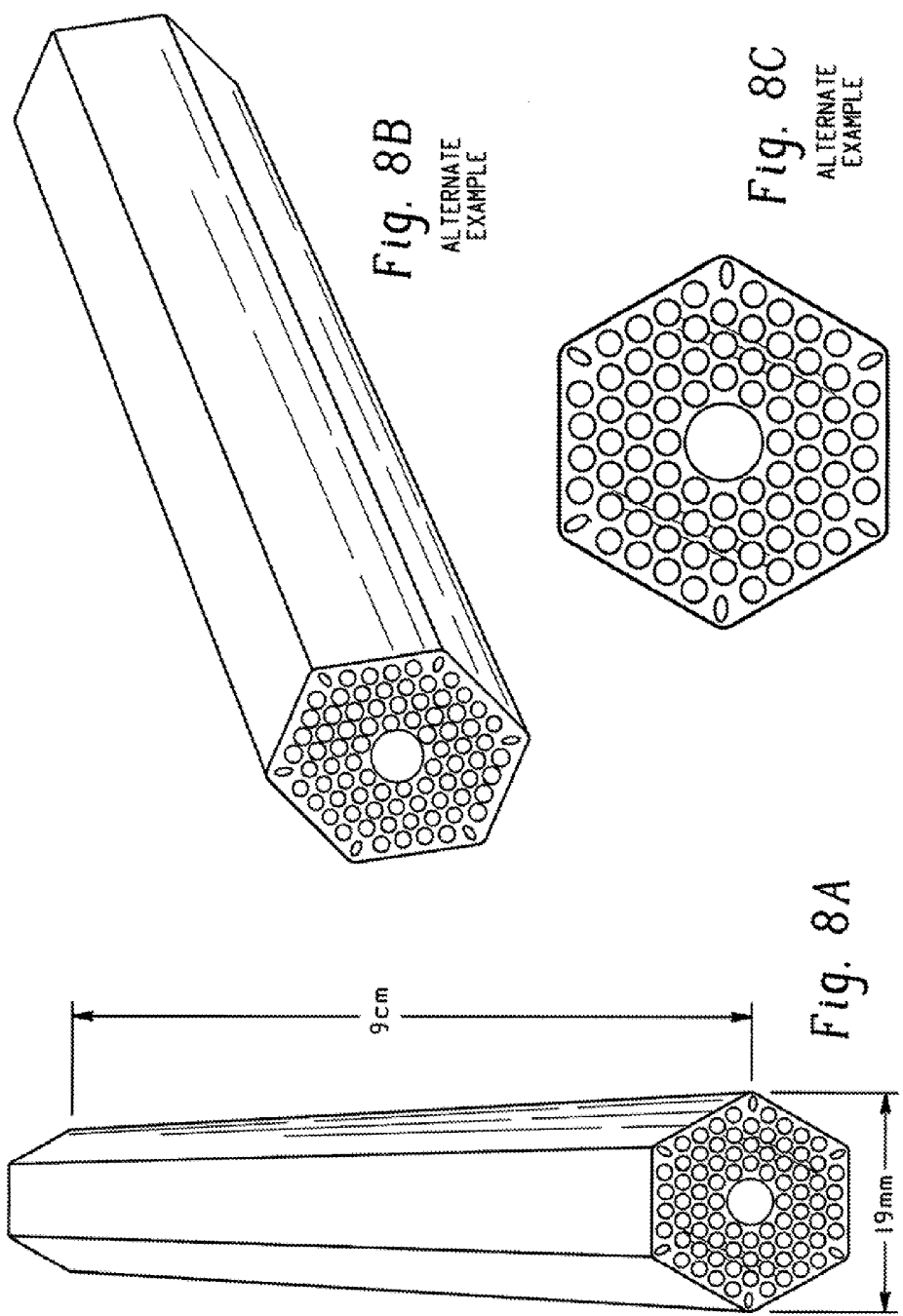

DIRECT EXTRUSION METHOD FOR THE FABRICATION OF PHOTONIC BAND GAP (PBG) FIBERS AND FIBER PREFORMS

TECHNICAL FIELD

The present invention relates to a novel method to make preforms from specialty glass for microstructured photonic band gap (PBG) fibers, to the structured preforms fabricated by the method, and to the microstructured PBG fibers drawn from the preforms.

BACKGROUND

Optical fibers have found increasing uses in industrial, scientific, and military applications. Conventional optical fibers guide light passing through them using the principles of total internal reflection. Total internal reflection (TIR) occurs when light travels through a material having a high index of refraction n and strikes an interface between that material and a material having a lower value of n. If the angle of incidence of the light on the interface is greater than some angle, known as the "critical angle," $\theta_c$, the light cannot pass through the interface into the lower-refractive material but instead is reflected back into the higher-refractive material. Thus, for optical glass fibers, the principle of total internal reflection requires that the inner core of the fiber have a higher index of refraction than the outer cladding. However, due to the nature of the materials used, such conventional fibers still exhibit some absorption and scattering of the light traveling through them and can therefore suffer some loss as the signal travels through the fiber.

More recently, microstructured optical fibers have been developed in an attempt to improve the transmission and reduce the leakage of light traveling therethrough. These microstructured optical fibers include hollow core photonic band gap (HC-PBG) fibers. Like conventional optical fibers, HC-PBG fibers have a three-layer structure comprising a core area, an intermediate cladding surrounding the core area, and a jacket made of solid glass surrounding the cladding. However, in HC-PBG fibers the cladding is not solid as in conventional optical fibers, but instead comprises a microstructured region having a periodic arrangement of glass and holes, which confines the light to the core of the fiber.

HC-PBG fibers operate on the principle of two-dimensional photonic bandgap confinement, a condition which prohibits the propagation of specific wavelengths within the photonic bandgap cladding region. The existence of a photonic bandgap is governed by the wavelength of interest, and the transverse dielectric function of the fiber. The transverse dielectric function describes the refractive index of a cross-section of the fiber and is governed by the refractive index of the glass, the shape and location of the holes, the hole diameter and pitch, the ratio of which governs the air fill fraction, and the lattice arrangement, i.e., triangular, square, etc. Since the light in HC-PBG fibers is confined primarily to the air void in the hollow core, and not the glass as in conventional TIR fibers, both signal loss and light-induced fiber damage due to transmission through a solid glass core, are reduced. This enables HC-PBG fibers to transmit higher energy signals over longer distances.

Microstructured optical fibers have been fabricated from silica and other glasses, and their design and manufacture have been described in the literature. For example, see R. F. Cregan et al., "Single-mode photonic band gap guidance of light in air," Science, Vol. 285, pp. 1537-1539 (1999) (describing photonic band gap (PBG) guidance of light through optical fiber comprising tubes of silica glass arranged in a periodic pattern); S. Barkou et al., "Silica-air photonic crystal fiber design that permits waveguiding by a true photonic bandgap effect," Optics Letters, Vol. 24, No. 1, pp. 46-48 (1999) (describing silica glass fiber having air holes arranged in a honeycomb pattern with an additional central air hole in which light having specific wavelengths can be confined); and N. Venkataraman, et al., "Low loss (13 dB/km) air core photonic band-gap fibre," ECOC, Postdeadline Paper PD1.1, September, 2002 (describing low signal loss properties of silica glass HC-PBG fibers).

The periodic layered structure of holes and glass in the HC-PBG fiber creates a photonic band gap that prevents light from propagating in the structured region, i.e. a two dimensional band gap confinement as noted above. As such, light is confined to the hollow core. The core of the fiber takes the place of a defined number of holes in the periodic structure. For example, the core may take the place of seven small holes in the periodic structure, thus this arrangement is referred to as a 7-cell HC-PBG fiber. Similarly, a 19-cell HC-PBG fiber has a larger core, which takes the place of 19 small holes in the periodic structure. Typically, the periodicity of the holes is on the scale of the wavelength of light being transmitted and the outer glass is used for providing mechanical integrity to the fiber. Because light traveling in the hollow core experiences greatly reduced losses, longer path lengths may be fabricated. Also, non-linear effects experienced, for example in solid core devices, are negligible in HC-PBG fibers and damage thresholds will be higher, such that higher power laser energy can be transmitted through the fiber, making it suitable for military as well as commercial applications. Further, due to the fact that light is guided in the hollow core, an analyte disposed therein will have maximum interaction with light, unlike traditional evanescent sensors.

Microstructured optical fibers, though conventionally fabricated using glass, also can be made from non-silica glass such as chalcogenide glasses. See, e.g., U.S. Patent Application Publication No. 2005/0074215; U.S. Patent Application Publication No. 2006/0230792; U.S. Patent Application Publication No. 2010/0303429; and U.S. Pat. No. 7,295,740, each of which shares at least one inventor in common with the present invention.

The periodicity of the holes, the air fill fraction, and the refractive index of the glass dictate the position of the photonic band gap, i.e. the transmission wavelengths guided through the hollow core. Such microstructured optical fibers are typically made using a preform comprising an outer shell and a number of hollow tubes arranged in a periodic structure, with a hollow core, which is then drawn into the final fiber. See U.S. Pat. No. 6,847,771 (describing microstructured optical fibers and fabrication of such fibers from optical fiber preforms).

The preform is typically comprised of a central core structured region, typically made by stacking microtubes or microcanes, which is then inserted into a supportive outer jacket or tube. In the preform, a number of glass microtubes placed in a periodic arrangement between the core and the outer jacket form the cladding. Such microtubes are hollow tubes having an opening, i.e., a hole, extending through their entire length, while microcanes may be solid or hollow. The arrangement of the microtubes and/or microcanes creates a periodic structure of glass and holes in the cladding which affects the transmission of light therethrough. The preform is then drawn to create the optical fiber.

However, because the microtubes and/or microcanes comprising the cladding do not always fit together perfectly, the assembly process inevitably introduces gaps, or voids, at the interfaces between the microtubes/microcanes or between the cladding area and the outer jacket. Additionally, conventional processes rely on stacking the microtubes or microcanes, by hand or otherwise, which may result in errors in the periodicity of the fiber produced, as well as additional gaps or voids. Such "interfacial voids" extend longitudinally through the entire length of the preform and are connected to the ambient atmosphere outside the preform via the preform ends. Many of these voids can be eliminated during the fiber drawing or other heat treatment step as the tubes are drawn closer together, but often some of these voids remain as "interstitial voids." These interstitial voids are not connected to the atmosphere outside the fiber but are trapped within the fiber.

The presence of both the interfacial and interstitial voids is undesirable. The interfacial voids run the entire length of the preform and have a size similar to that of the intended holes in the structured region and so can make fiberization difficult. This is especially true for specialty oxide and non-oxide glasses where the vapor pressure during fiberization may be sufficient to prevent collapse of these interstitial voids. Furthermore, the accuracy of the periodicity and position of the intended holes is critical to attaining band gap guidance in the fiber, and is adversely affected by the presence of such "stray" holes in the fiber caused by incorrect tube positioning and tube slippage during fiberization, which can destroy the ability of the fiber to perform properly. As such, interstitial voids are common deficiencies of the tube stacking preform method.

Conventional processes attempt to reduce or eliminate the number of such interstitial voids by using a two-step process, in which the tubes in the preform are consolidated prior to fiber drawing. However, this two-step process still leaves an undesirable number of interstitial voids in the finished fiber.

Another process involves the application of a vacuum during drawing to reduce the presence of voids. However, this may cause soot to accumulate on the preform that can interfere with optical performance of the HC-PBG fiber. Other processes have been attempted, but no process has achieved the desired result of rendering a HC-PBG fiber devoid of interstitial spaces that degrade fiber performance. What is desired is a method to produce a HC-PBG fiber preform that does not suffer from the presence of voids or gaps that degrade the performance of the resulting optical fiber.

BRIEF DESCRIPTION

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a method and an apparatus for making a HC-PBG fiber preform by a direct extrusion process, the preform suitable for fabricating a substantially void-free microstructured optical fiber. In the method of the present invention, a preform for the optical fiber is prepared from specialty glass and comprises a structured inner region, or a structured inner region surrounded by a jacket region, wherein either the structured inner region, or the structured inner region and the outer jacket region, are formed by direct extrusion of the specialty glass through a structured die. The thus-prepared preform is then placed into a fiber draw tower to render void-free HC-PBG fibers. Thus, the final microstructured fiber can be prepared in one step, without the need for employing a consolidation step to remove interstitial voids, as used in other methods, given that no such voids are present. Interstitial voids, as noted above, are the result of using a preform fabricated from stacked microtubes. As no stacking process or microtubes are used in the current method, the creation of unintended voids is eliminated.

The preforms according to the present invention can include one or more components fabricated from specialty non-silica glass, such as chalcogenide and chalcohalide glasses and other oxide glasses including specialty silicates, germanates, phosphates, borates, gallates, tellurites, antimonates and their mixtures. Such specialty glasses are characterized by a much lower softening temperature than silica glasses, making them better suited for certain fabrication processes, specifically direct extrusion processing, wherein the entire structured region of the preform is formed in a single extrusion step. The method provided herein has an advantage in this regard over other processes wherein silica glasses, that require much higher processing temperatures, are used.

An apparatus for use in the present invention includes a die comprising an outer portion, a plurality of pins, and a pin support. The pins are disposed in a specific arrangement designed to allow for the passage and direction of softened glass around the pin support and into the spacing between and around the pins to generate the structured preform. The entire structured preform may then be stretched on a fiber draw tower, at a temperature corresponding to a glass viscosity in the range of about $10^4$ to about $10^6$ Poise, into a microstructured fiber with considerably smaller dimension than the preform.

BRIEF DESCRIPTION OF THE DRAWINGS

FIGS. 1A-1E are cross-sectional views of the structure of an exemplary hollow core photonic band gap (HC-PBG) fiber preform as described herein.

FIGS. 8A-8C are diagrams of the substantially void-free microstructured optical fiber prepared from the preform shown in FIG. 6.

DETAILED DESCRIPTION

The aspects and features of the present invention summarized above can be embodied in several different forms. The following description shows, by way of illustration, various combinations and configurations in which aspects and features of the invention can be put into practice. It is understood that the aspects, features, and/or embodiments described herein are merely examples, and that one skilled in the art may utilize other aspects, features, and/or embodiments or may make structural and functional modifications without departing from the scope of the present disclosure.

In describing optical fibers, the term "microstructured" is typically used to describe a structure with features on the micro scale (between approximately 1 μm and 1000 μm) and the term "structured" is typically used to describe features of any scale, including features smaller than, larger than, or the same size as "microstructured" features. In the present disclosure, the term "microstructured" is used in describing features of a "microstructured" optical fiber and the term "structured" is used in describing features of an optical fiber preform from which the "microstructured" optical fiber is drawn, regardless of the actual or approximate sizes of the features. This choice of language is for clarity only, and the terms "microstructured" and "structured" can be used interchangeably without departing from the scope of the present disclosure. The fibers themselves are fully described in US Published Application 2010/0303429, filed May 26, 2009, which shares common inventorship with and is assigned to the same assignee as the current disclosure. As such, that application and its relevant teaching is incorporated herein in its entirety.

In addition, with respect to conventional, known HC-PBG fibers, as used herein, a "tube" or "microtube" typically possesses one longitudinal capillary running through the entire length thereof. The tubes and microtubes may have arbitrary outer and inner transverse shapes and may be the product of a combination of various fabrication methods including extrusion, molding, rotational casting, stack and redraw, etc. For example, a "microtube" may be extruded and then stretched on a fiber draw tower and may possess a circular or hexagonal outer transverse shape, and a circular inner transverse shape.

As noted above, HC-PBG microstructured optical fibers have been developed to improve the transmission and other properties of optical fibers, such as the transmission of specific desired wavelengths of light. These improved optical properties are the result of the specific structure of the fibers fabricated from the preform in accord with this disclosure.

Figure 1C:
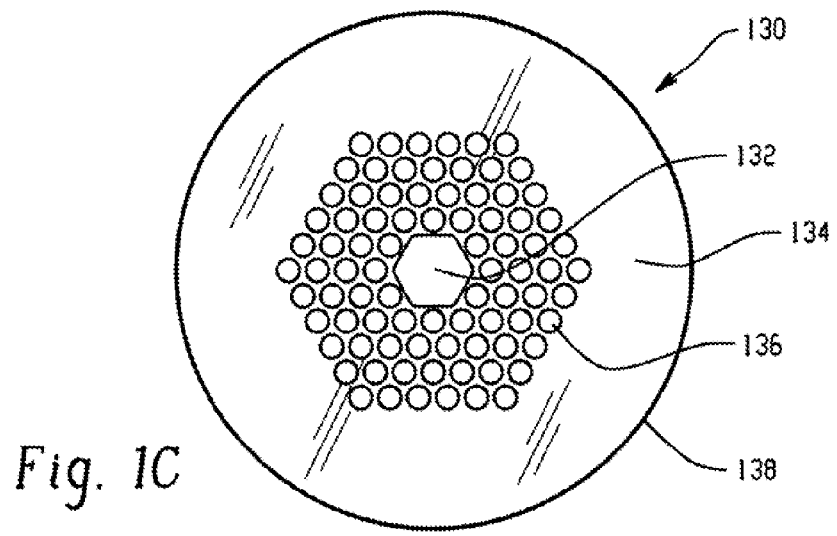
Figure 1D:
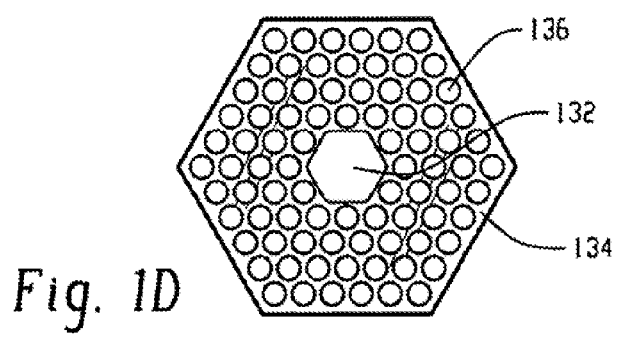

The cross-section of the exemplary HC-PBG microstructured optical fiber shown in FIG. 1C illustrates the structure of the fiber that results from the direct extrusion process and method in accord with the disclosure and described more completely below. As seen in the Figures, HC-PBG fibers (FIG. 1B) comprise an outer layer of glass 138, a core 132, and a cladding 134 exhibiting a transversally periodic arrangement of glass 104 and holes 136 together comprising cladding 134, having longitudinal capillaries extending through the length of the fiber. In the description herein, one or more capillary in the fiber may also at times be referred to as a "hole" or an "air hole." In addition, as used herein, "air" can include not only air but also can include other gases such as helium, nitrogen, or argon, while an "air hole" may contain air, other gases, or no gas at all, i.e., be a vacuum, and all such cases are within the scope of the present disclosure. It is the distribution of glass and air (or, as noted above, other gases or vacuum) by the components of these regions that create the particular optical properties of the fiber. It is noted that in different figures like elements, where possible, retain the same reference numeral, unless otherwise specified.

In the HC-PBG fiber, cladding 134 of the fibers is not solid as in conventional optical fibers, but instead includes a microstructured region having a periodic arrangement of glass 104 and air holes 136. Typically, the periodicity of the holes is on the scale of the wavelength of light to be transmitted. Because the cladding comprises both glass and air, the refractive index of the cladding region is different than it would be if the cladding were solid glass. In addition, by varying the number, size, and periodicity of the air holes, the refractive index of the cladding area can be tuned so that the fiber exhibits desired optical properties such as transmission of a desired wavelength of light.

As seen in FIGS. 1A-1E, the method in at least one embodiment of the invention involves the direct extrusion of the HC-PBG fiber preform. FIG. 1A provides a diagram showing extruder 100 which includes an extrusion barrel 102 for receiving the specialty glass 104 used to create the preform. Specialty glass 104 is charged to extruder barrel 102. As piston 106 is engaged in the direction of arrow A it forces the specialty glass 104 to flow into the die region 120 of extruder 100.

Specialty glasses are considered well suited for use herein due to the desire to generate fibers suitable for use with wavelengths between about 2 and 12 μm, in the infra-red portion of the spectrum. The glasses set forth herein are transparent, or transmit, in at least a portion of this range. Conventional, silica-based or other oxide glasses transmit only in those wavelengths below 2 μm, i.e. below the infra-red. Such fibers have been used and find application in other areas, such as fiber-optic telecommunications, especially where the processes used require higher temperatures and chemical stability of the microtubes being stacked. Non-silicate glasses of the type preferred for use herein are generally to viscous at such high temperatures and also experience out-gassing at the tube surfaces, causing the integrity of the chemical balance to suffer.

With regard to the specialty glass used in the method disclosed herein, such glasses, as noted above, include non-silicate glasses, characterized by a low softening temperature, for example about 160° C. to about 450° C., as compared to other glasses having much higher softening temperatures, for example silica having a softening temperature of 1665° C., germinate glasses having softening temperatures above about 600° C., and borosilicate, or Pyrex®, having a softening temperature of about 820° C. As such, as used herein, the term "low softening temperature" refers to the "Littleton softening temperature", or that temperature at which the glass exhibits a viscosity of $10^{7.6}$ Poise, above below about 500° C. Such glasses may be found to suit not only the desired parameters for the specific application of the HC-PBG fiber being prepared, i.e transmission in the infra-red wavelengths, but also the processing parameters of the direct extrusion method used herein, including chemical stability.

For example, non-silicate glasses exhibiting the requisite low softening temperature include for example chalcogenide glasses, especially sulfide glasses, selenide glasses, and telluride glasses. For example, arsenic sulfide, arsenic selenide, or mixtures thereof, with other chalcogenide or non-silicate glasses, may be employed. In one embodiment, the specialty glass is a chalcogenide glass comprising arsenic sulfide or arsenic selenide. In other embodiments, the non-silicate glasses suitable for use herein may further include halide glasses, chalcohalide glasses, gallate glasses, tellurite glasses, and combinations thereof. For example, the specialty glass may be one selected from families of glasses including at least one or more of sulfide, germanium, arsenic, selenide or telluride, i.e, As—S—Se, As—Se—Te, As—S—Se—Te, Ge—As—Se—Te, Ge—As—Se, or Ga—La—S.

Within each family of glass, the ratio of individual constituents may vary, i.e. a specific composition of arsenic sulfide glass may comprise for example As(40)S(60), As(30)S(70), As(40)S(20)Se(40), or As(40)S(50)Se(10). Likewise, other glass families may include many glasses having one or more of the same constituents, but at differing levels.

In addition, glasses used in accord herewith may include dopants, generally in smaller amounts, for example up to about 5 atomic %, for example, 1-5 atomic %. Such dopants are generally selected to improve specific properties of the glass, as one skilled in the art would be aware. Dopants may include, among others, for example, Er, Ga, La, and the like.

As noted above, in one embodiment the specialty glass is an arsenic sulfide glass, wherein the glass contains Ar(30-40) S(70-60), or a range of glasses including Ge—As—Se—Te, such that the basic constituents are included as Ge(1-10)As (27-39)Se(50-61)Te(1-10), for example Ge(5)As(32)Se(59) Te(4). Of course, the foregoing compositions are intended only as exemplary and should not be considered in any way limiting with regard to this aspect of the invention disclosed herein.

Figure 1E:
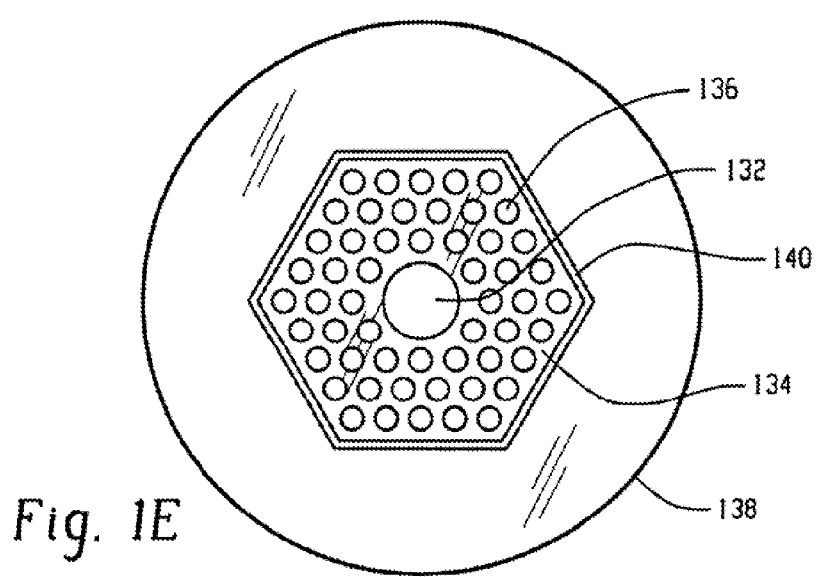
Figure 2A:
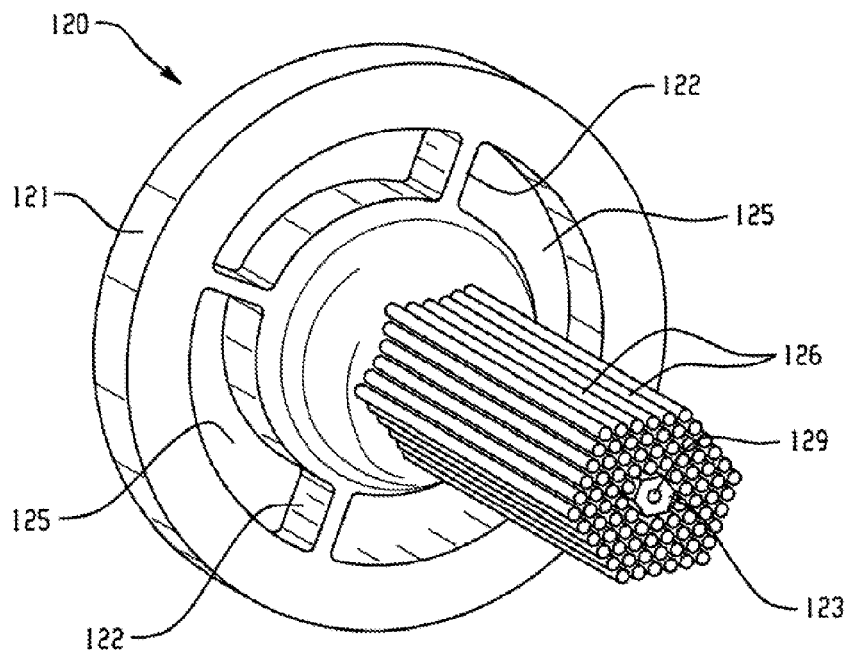
FIGS. 2A-2D provide a view of the die structure used in the method in accord herewith.
Figure 2B:
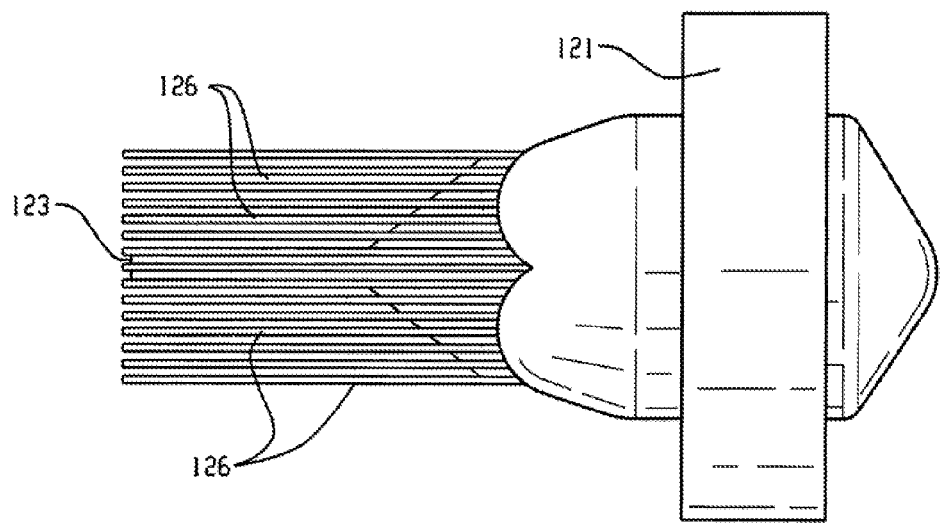
Figure 2C:
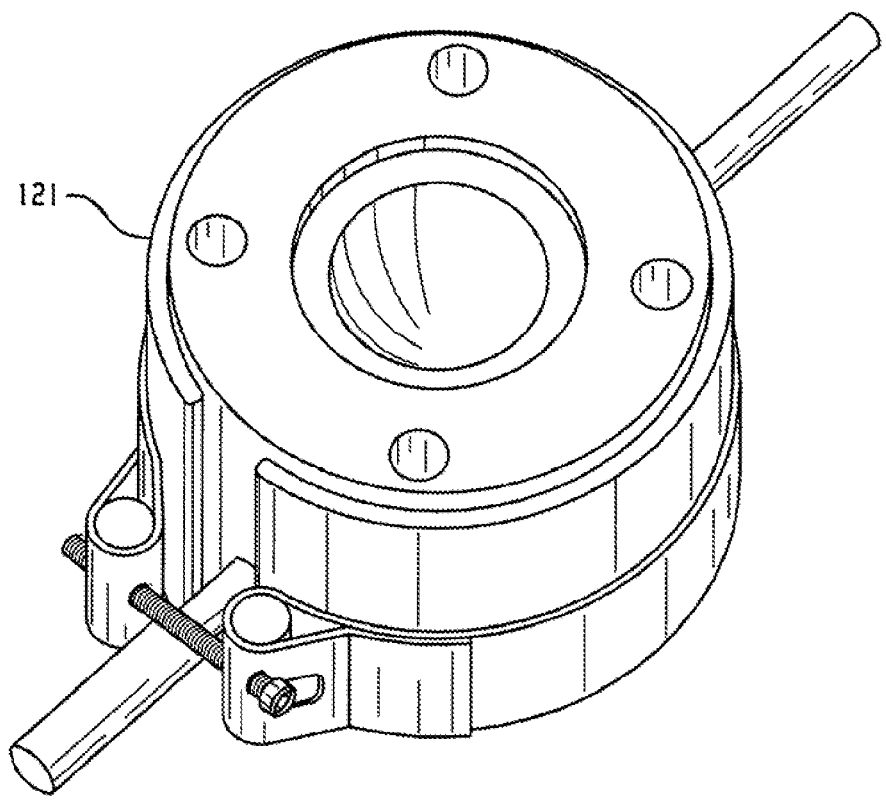
Figure 2D:
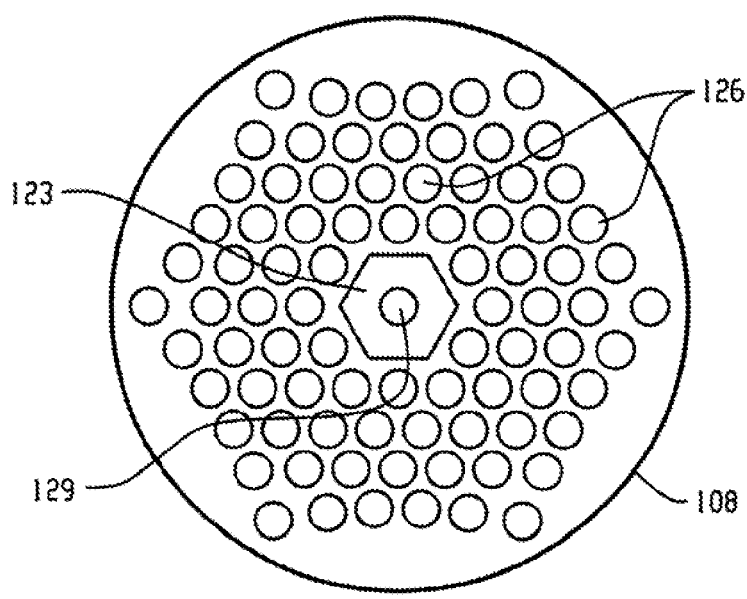

With continued reference to FIGS. 1A-1E, FIG. 1B provides a diagram of primarily the die region 120 of extruder 100. FIGS. 2A-2D provide views of the die structure used in the method. FIGS. 2A and 2B provide an extrusion end view and a side view, respectively of the die structure, including die 120 having an outer portion 121 with channels 125 and channel supports 122 for passing the glass to the die. Further, pins 126 and center pin 123, having purge channel 129 are shown. FIG. 2C provides a view of the die from the glass input end, and FIG. 2D provides a view from the extrusion end of the die.

With reference again to FIG. 1B, specialty glass 104 is forced by piston 106 into die region 120. The die region includes die outer portion 121 having disposed therein a plurality of pins 126 which extend longitudinally; axially from the die toward the extrusion end 108 of the extruder 100. Pins 126 are arranged in a periodic pattern, better seen in FIGS. 1C-1E, and FIGS. 2A-2D to achieve the desired band gap in the finished HC-PBG fiber. In addition, die region 120 includes solid center pin 123, at the center thereof to create the hollow core 132 of the resulting fiber.

Figure 3:
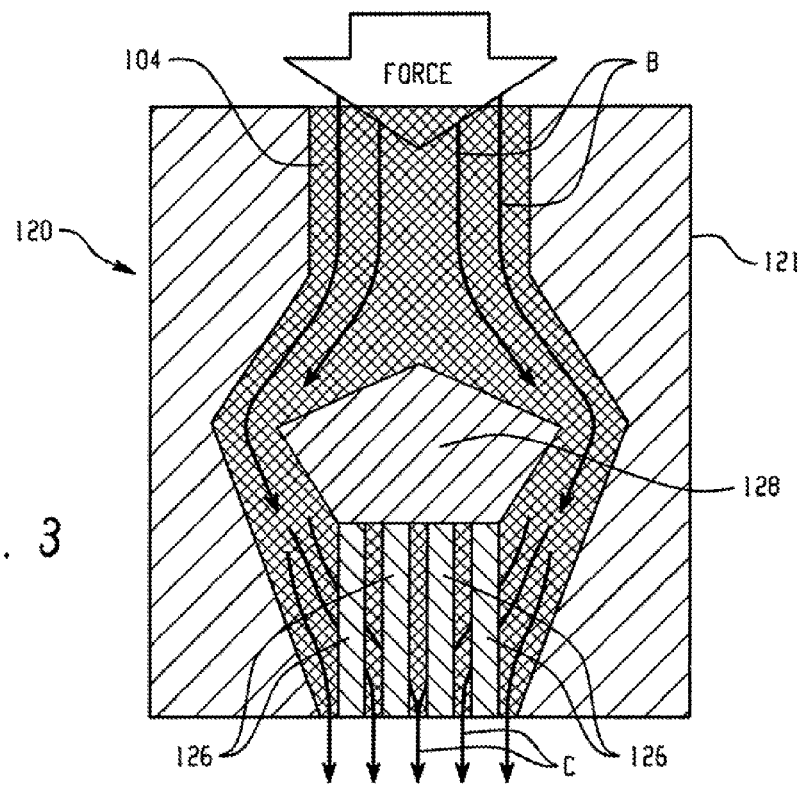
FIG. 3 provides a diagram of the material flow pattern for the method in accord herewith.

As shown in the diagram of the material flow pattern provided in FIG. 3, the method in accord with at least one embodiment hereof starts with a bulk rod of specialty glass 104. The glass is softened, and forced through die 120 designed to reshape the transverse cross section of the glass rod and impart a plurality of longitudinal holes. The die is comprised of an outer portion 121, a plurality of pins 126 disposed within the outer portion, and a pin support 128. The die is specially designed with channels in a specific arrangement to allow for the passage of the softened specialty glass into the die region 120 in the direction of arrows B. The softened glass then flows, within the die outer portion, around the pin support/insert, which includes die pin support portion 128 and pins 126, and into the spacing between and around pins 126 from the sides, as shown by arrows C, as directed by the outer portion and shape 121 of the die. The formed glass is then extruded as the preform 130. In this manner, the pins create hollow capillaries and the central solid area of the die insert creates the hollow core of the preform. The HC-PBG fiber preform structure is seen with reference to FIG. 1C, which provides a cross-sectional view thereof, including hollow core 132, capillaries or air holes 136 set in a periodic pattern in the glass 104 to form cladding 134, which is in turn disposed within jacket 138, which is a glass outer region of the HC-PBG fiber that supports the fiber.

The die may be fabricated from a material that is compatible with the glass to be extruded, and as such may be comprised of, for example, stainless steel, graphite, silica, or another such material, and further may be coated with one of these or another such material. The die, the glass, or both may be heated during the extrusion process to aid in reduction of the viscosity of the glass.

The entire preform, consisting of the structured inner region and the outer jacket region, as shown in cross section in FIG. 1C, may be formed in a single direct extrusion process, as set forth above. Alternatively, the structured inner region and the surrounding outer jacket region may be formed separately, using a direct extrusion process for one or both regions, and then later assembled to make the structured preform. In this latter scenario, the structured inner region, formed by the foregoing extrusion process and in accord with the cross-sectional view provided in FIG. 1D, may be assembled with an outer jacket or sleeve 140 as shown in FIG. 1E. Prior to insertion into the outer jacket, the structured inner region may be stretched to a smaller dimension. The entire structured preform, whether extruded in a single step or extruded separately and then assembled, may then be stretched in a fiber draw tower to form a microstructured fiber having a considerably smaller dimension than that of the preform. The draw tower may be operated at a temperature corresponding to a glass viscosity in the range of about $10^4$ to about $10^6$ Poise.

Figure 4A:
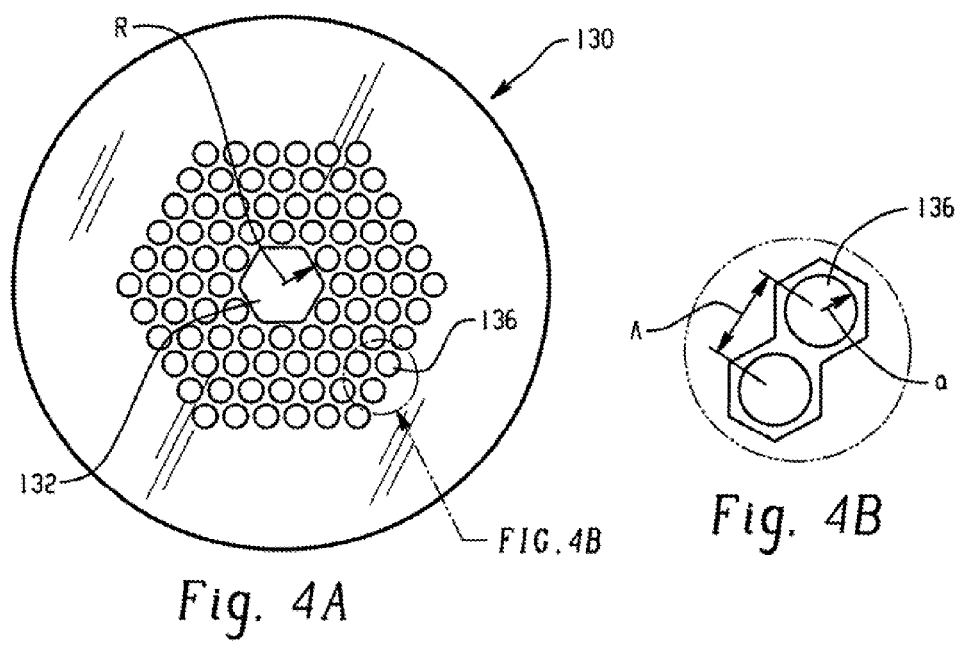
FIGS. 4A and 4B provide a cross-section view of an HC-PBG fiber preform and an exploded view of two capillaries or holes within the preform, setting forth the special relationship thereof in accord herewith.
Figure 4B:
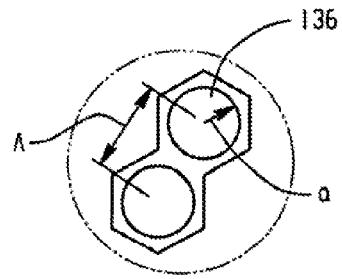

FIGS. 4A and 4B provide a cross-sectional view of a preform 130 and an exploded view of two capillaries or holes within preform 130. As can be seen, core 132 has a radius "R", and each air hole 136 has a radius "a". The air hole or capillary spacing, i.e. the spacing from the center of one air hole to the center of an immediately adjacent air hole, defines the periodicity "Λ" of the air hole configuration of the fiber. The periodicity and the radius of the air holes define the air fill fraction of the cladding, which combined with the refractive index of the glass dictate the optical properties of the fiber. As used in the art, the term "air fill fraction" refers to the ratio of the cross-sectional area of the capillaries to the combined area of the capillaries plus the solid material, or equivalently, the ratio of the volume of the capillaries to the total volume (volume of the capillaries plus volume of the solid material), in the microstructured region. More specifically, when the hole shape and arrangement is regular, the air fill fraction of a specific microstructured optical fiber design can be defined algebraically as a function of the ratio of the hole radius, r, to the hole pitch, Λ. For example, the air fill fraction for a microstructured optical fiber with round air holes arranged periodically in a triangular lattice, equals $$\left(\frac{r}{\Lambda}\right)^2 \times \left(\frac{2\pi}{\sqrt{3}}\right)$$

Similarly, for a HC-PBG fiber with round holes in a square lattice, the air fill fraction equals $$\left(\frac{r}{\Lambda}\right)^2 \times \pi.$$

If the air holes are not perfectly shaped or sized or are not arranged in a perfect lattice arrangement, the air fill fraction is not easily calculated but can be measured by computer.

The ratio of the air hole radius to the periodicity in the fiber is preferably between about 0.4 and 0.49, corresponding to an air fill fraction of 60%-90. In some embodiments, the ratio could be smaller, for example about 0.2 to about 0.49, and the air holes could be expanded during the subsequent drawing step to yield the preferred ratio in the final fiber, as set forth in U.S. Pat. No. 7,295,740, referred to herein above.

In HC-PBG fibers, the core 132 consists of an air hole that has a different size than the air holes 136 in the surrounding cladding 134. The air hole comprising core 132 will have a much lower index of refraction than the cladding 134 due to the presence of glass in the cladding region. In an HC-PBG fiber, the cladding 134 creates a photonic band gap that prevents light from propagating appreciably in the cladding 134, and so light is primarily confined to the lower index hollow core. It should be noted that, although in an exemplary embodiment used to illustrate the concepts of the invention the core region is filled with air, in other embodiments the "air hole" comprising the core 132 may be filled with another gas, such as, for example, nitrogen, helium, carbon dioxide, argon, or mixtures of such gases, or may also be under vacuum.

In addition, in HC-PBG microstructured fibers, there can be many variations on the configuration of the core. For example, the fiber can have one single core or multiple distinct cores, for example, to encourage interaction between separate signals confined to separate cores. In addition, the transverse shape of the one or more of the cores can have a round, elliptical, hexagonal, or another shape, and the one or more cores can have either the same or different shapes, for example, to impart a birefringence condition for maintaining the polarization state of the propagating signal. These variations in the microstructured fibers can be accomplished by preparing a die for use in the direct extrusion of the preform used to generate the fiber in accord herewith.

In HC-PBG fibers, these parameters determine the position of the photonic band gap, i.e., namely the wavelengths of light that can be guided through the hollow core. Thus, it is very important to maintain the intended glass-hole structure of the fiber, without the presence of unintended additional holes due to interstitial voids or the absence of intended holes due to collapse of one or more microtubes. The present invention provides a method and an apparatus that can achieve these results given that the preform does not include stacked and drawn microtubes.

In some embodiments of the present invention, one or more of the jacket and the cladding may be made of a specialty non-silica glass, in keeping with the disclosure provided hereinabove. Suitable specialty glasses include chalcogenide glasses such as sulfides, selenides, tellurides and mixtures thereof, and chalcohalide glasses and other oxide glasses, including specialty silicates, germanates, phosphates, borates, gallates, tellurites, antimonates and mixtures thereof. In addition, more than one glass may be used. One or more of these glasses may be a specialty glass or a non-specialty glass, and all of such combinations may be used to make microstructured optical fibers within the scope of the present disclosure.

Figure 5:
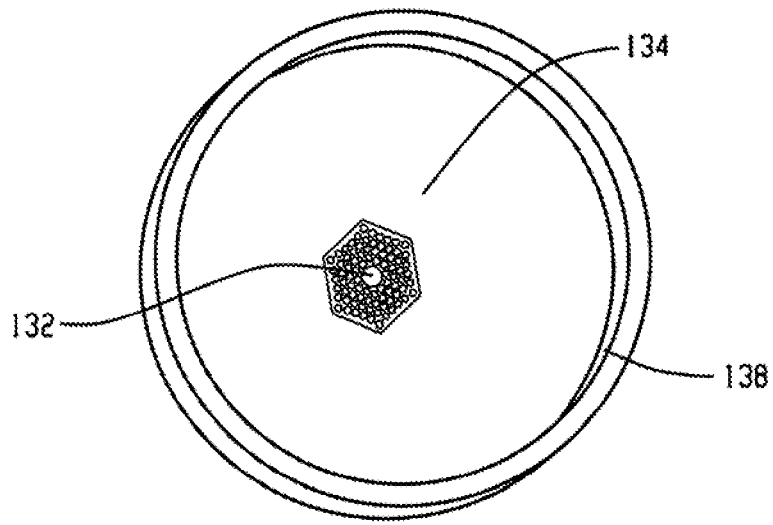
FIG. 5 is a cross-sectional diagram of a substantially void-free microstructured optical fiber preform made from the direct extrusion method in accord herewith.
Figure 6:
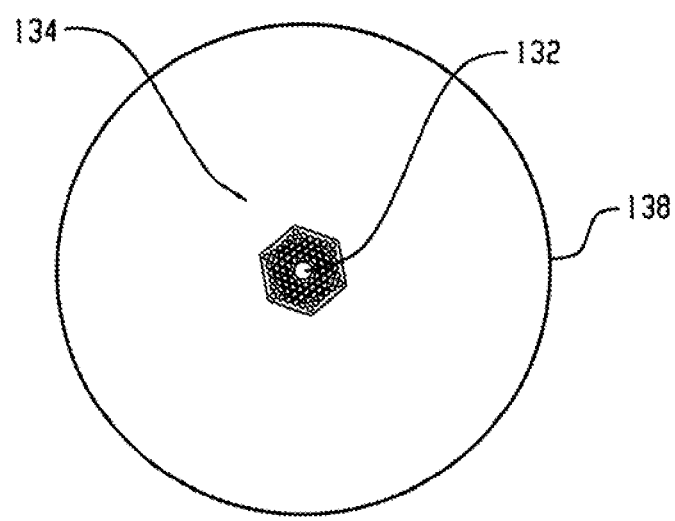
FIG. 6 is a cross-sectional diagram showing a substantially void-free assembled HC-PBG preform with a center section prepared by direct extrusion in accord herewith.

An exemplary general form of a structured preform for a microstructured optical fiber is shown in FIG. 5, and comprises an outer jacket 138, an inner structured region 134 also known as the cladding, typically comprising a periodic arrangement of solid glass and holes, and a central core 132 which, as noted above, comprises a hollow space. A typical preform such as that illustrated in FIG. 5 has an outer diameter of about 10 mm to about 20 mm. FIG. 6 is a cross-sectional view of the fiber generated using the preform of FIG. 5.

The accuracy of the periodicity and position of the intended holes in the microstructured region created by the direct extrusion method in accord herewith is a significant advantage in attaining band gap guidance in the HC-PBG fiber. The precision achieved by the current inventive method is generally not achievable using more conventional stack and draw methods which are adversely affected by incorrect tube positioning and tube slippage during fiberization, both of which are common deficiencies of the tube stacking method.

In conventional methods, a preform assembled by the stacking of microtubes inevitably will have one or more gaps, or "interfacial voids," between the outer surfaces of adjacent microtubes or between an outer surface of a microtube and the jacket layer. These interfacial voids extend longitudinally through the entire length of the preform, and thus are connected to the ambient atmosphere outside the preform via the preform ends. In some cases, these interfacial voids may be localized to a single pair of microtubes or to one or more microtubes and the outer jacket. In other cases, such interfacial voids may occur at the interface between several microtubes.

Conventional methods have attempted to eliminate these voids through consolidation or some other heat treatment step before fiber drawing, wherein the space between the microtubes collapses thus eliminating the interfacial void. However, since the interfacial voids often have a size similar than those of the intended holes in the structured region of the preform, and run the entire length of the preform, it is difficult to eliminate such voids completely. This is especially true for processes using specialty oxide and non-oxide glasses where the vapor pressure during fiberization may be sufficient to prevent collapse of these interstitial voids.

If the interfacial void does not collapse, it will become trapped in the final fiber, forming an "interstitial void". Examples of optical fibers having such interstitial voids can be seen in FIGS. 7A and 7B, which provide cross-sectional views of a microstructured optical fiber manufactured according to conventional methods. The preform used to fabricate the fiber shown in FIGS. 7A and 7B was assembled by stacking microtubes and then consolidated using a separate and subsequent heat treatment step prior to the fiber drawing step. The fiber shown in FIG. 7A comprises a jacket region 301 having an outer diameter of approximately 150 μm, a hexagonal microstructured cladding region 302 comprising a plurality of longitudinal holes each having a diameter of approximately 7 μm, solid filler regions 303 at the corners of the cladding region, and single solid core 304 having a diameter of approximately 7 μm. Though FIGS. 7A and 7B correspond to a solid core fiber, the same affect due to interstitial voids is seen in hollow core fibers.

Figure 7A:
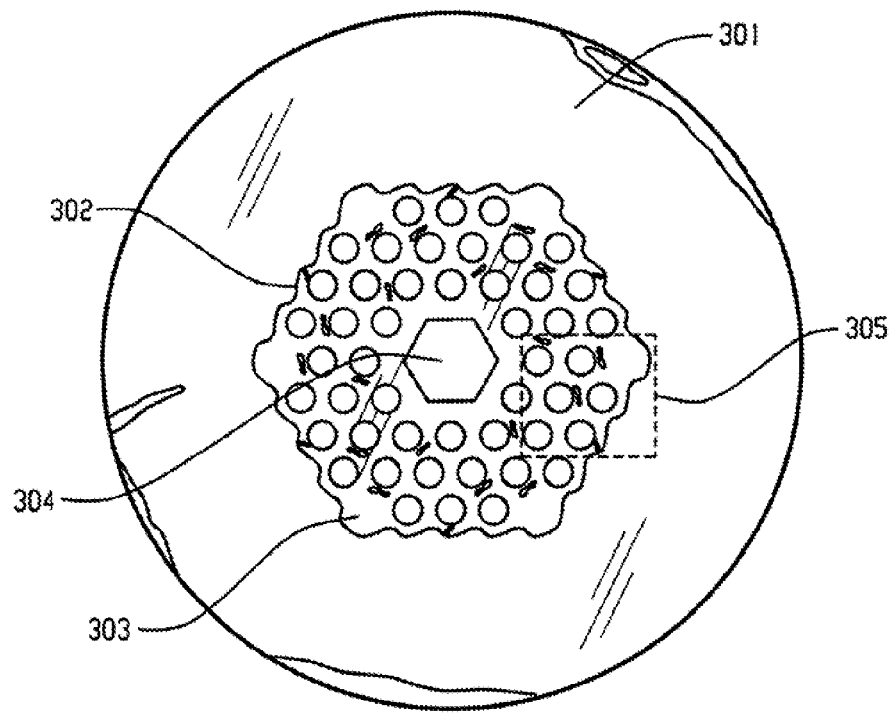
FIGS. 7A and 7B are diagrams showing the presence of interstitial voids in microstructured optical fibers prepared according to the prior art.
Figure 7B:
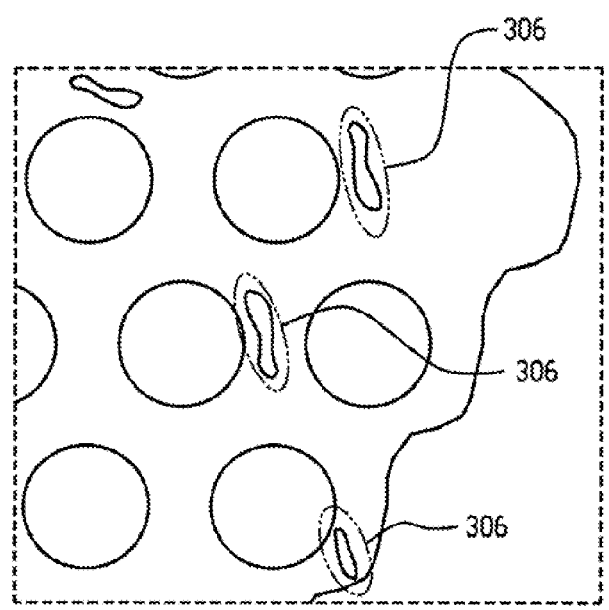

FIG. 7A also shows a highlighted region 305 which is shown in more detail in FIG. 7B. As seen in FIG. 7B, the fiber has numerous multiple micro-bubbles or interstitial voids 306 within the cladding region and between the cladding and jacket regions. These interstitial voids are voids in the fiber that are surrounded by glass, not connected to the atmosphere outside the fiber. Their size, position and frequency also varied along the length of the fiber. These voids are the result of the failure of the consolidation and heat treatment step to completely eliminate gas pockets from forming in the fiber.

The presence of such interstitial voids can have significant adverse effects on the final fiber. For example, interstitial voids in an HC-PBG fiber can compromise the photonic bandgap and prevent the efficient transmission of light through the fiber core because all of the light will scatter through the cladding and/or the jacket, with none of the light passing through the fiber in its intended path. Consequently, it is desirable to eliminate voids from the preform before they become trapped as interstitial voids in the final fiber.

As noted above, conventional methods attempt to consolidate the preform before the fiber drawing step. However, it often is not possible to fully eliminate the interfacial gaps in the preform by such a method, and interstitial voids may still remain, either in the consolidated preform or in the final fiber.

The present invention provides a method and apparatus for fabricating a preform for HC-PBG fibers that prevents the formation of interstitial voids. In accordance with the present invention, a direct extrusion process is employed to extrude a preform for use in the fabrication of microstructured optical fibers. The preform is fabricated from specialty glasses that have a much lower softening temperature than silica glasses. In addition, these glasses have the capability to transmit light in the infra-red wavelengths, above 2 μm, e.g. above about 2.4 μm e.g. up to about 2.12 μm. A microstructured optical fiber fabricated from a preform prepared in accordance with the direct extrusion method of the present invention will be substantially void-free and therefore will exhibit improved optical performance particularly in the infra-red portion of the spectrum.

As described in more detail below, in the method of the present invention, a structured preform is placed into a fiber draw tower for drawing into the final fiber. The assembled preform is stretched, for example, on a fiber draw tower at a temperature corresponding to a glass viscosity in the range of about $10^4$ to about $10^6$ Poise, into microstructured optical fiber with considerably smaller dimensions than the preform. The fiber outer diameter is typically less than about 1 mm and more typically less than about 500 μm, although a microstructured fiber, with an outer diameter typically greater than about 1 mm, and more typically between about 1.5 and 4 mm, may also be fabricated by this method.

The preform and resulting fiber in accord herewith may have an outer shape that is round, elliptical, hexagonal, or any other suitable shape. In addition, the core also can have any suitable shape such as round, elliptical, or hexagonal. Similarly, the microstructured cladding can have any appropriate shape and comprise multiple holes arranged in a periodic pattern between the core and the jacket. Irrespective of the number, arrangement, shape, or type of structures used in the microstructured cladding, as described above, use of the direct extrusion method set forth in the invention provides a preform that is void-free throughout its entirety. As described above, the presence of gaps can create undesired interstitial voids that result in performance problems in the final fiber. The current method eliminates the possibility of interstitial voids caused by the use of stacked microtubes to fabricate a preform, such voids being eliminated by the direct extrusion method provided.

The remainder of the drawing process is according to conventional methods. The resulting microstructured optical fiber prepared using the apparatus and method thus described is substantially free of interstitial voids and deformed microholes and therefore demonstrates lower transmission loss and better power handling than glass fibers made using conventional methods.

FIGS. 8A-8C present views of the substantially void-free optical fiber preform produced using the apparatus and method described herein. FIGS. 8A and 8B depict a preform having no readily visible voids, even in the close-up view shown in FIG. 8C. This is in stark contrast to the fiber shown in FIGS. 7A and 7B, which exhibits several voids in area 305 that are visible even before being shown in the close-up of FIG. 7B.

The improved microstructured optical fibers produced using the apparatus and method of the present invention will have an impact in both military and civilian applications. HC-PBG fibers in accord herewith can be used as sensors in facility clean up, biomedical analysis (e.g. glucose, blood, breath etc), CBW agent detection, toxic and hazardous chemical detection, and environmental pollution monitoring and process control, etc. In addition to chemical sensing, the HC-PBG fibers can be used for very high laser power delivery since the light is predominantly guided in the hollow core, unlike in traditional fibers which possess a solid core that will damage at high powers. In addition, HC-PBG fibers can also reduce system cost, weight, and complexity, and can enable remoting of high power lasers for industrial applications such as cutting, welding, metrology and for biomedical applications such as laser surgery, cancer removal and glaucoma treatment.

In either case, the method and apparatus of the present invention will improve the performance and reliability of these fibers and reduce the difficulty of their fabrication, particularly in HC-PBG fibers made from non-silica specialty glasses.

Although particular embodiments, aspects, and features have been described and illustrated, it should be noted that the invention described herein is not limited to only those embodiments, aspects, and features.

For example, the method of fabricating preforms by direct extrusion to create microstructured optical fibers is not limited to the types of structures shown in the Figures, but can also be used for more complex structures. Thus, the method can also be applied to structures having air hole transverse shapes other than round or hexagonal or jacket tubes with different inner transverse shapes, for example, to microstructured fibers having holes in a square lattice arrangement.

Furthermore, there is no constraint on uniformity in size or transverse shape of the individual pins in the die insert, i.e. sizes and shapes can vary as appropriate for a desired arrangement of holes or features in a microstructured fiber.

It should be readily appreciated that these and other modifications may be made by persons skilled in the art, and the present application contemplates any and all modifications within the spirit and scope of the underlying invention described and claimed herein.

The invention claimed is:

1. A method for manufacturing a preform for microstructured optical fiber, comprising:

providing a preform die in operative communication with a barrel of an extruder, the preform die comprising at least an inlet in a first end of the preform die for receiving softened glass from the barrel of the extruder, an outer portion having channels therein for directing the softened glass received from the barrel through the preform die, a center pin, a plurality of surrounding pins around the center pin and arranged in a desired periodic pattern, and an outlet in a second end of the preform die;

providing a specialty glass transmissive to light in the infra-red wavelengths above 2 μm and charging the same to the barrel of the extruder;

heating at least one of the barrel and the specialty glass to soften the glass and forcing the softened glass from the barrel through the inlet and into the outer portion of the preform die;

allowing the softened glass to flow through the channels of the preform die and around the center pin and the plurality of surrounding pins; and extruding a preform comprising at least an inner core corresponding to the center pin of the preform die, and a cladding around the core, the cladding including a plurality of air holes corresponding to the plurality of surrounding pins of the preform die and arranged in the periodic pattern of the pins in the preform die, each air hole comprising a longitudinal opening extending through the entire length of the preform, the preform being substantially free of interfacial and interstitial voids.

2. The method according to claim 1, wherein the air holes in the cladding are surrounded by specialty glass.

3. The method according to claim 1, wherein the microstructured optical fiber is a hollow-core photonic band-gap (HC-PBG) fiber.

4. The method according to claim 1, wherein the preform further includes an outer jacket surrounding the cladding, the outer jacket being extruded as part of the preform.

5. The method according to claim 1, wherein the perform is inserted into an outer jacket that is prepared separately from the preform.

6. The method according to claim 1, wherein the specialty glass is a non-silica glass selected from the group consisting of a chalcogenide glass, a chalcohalide glass, an oxide glass comprising specialty silicates, germanates, phosphates, borates, gallates, tellurites, and antimonates, and mixtures thereof.

7. The method of claim 5 wherein the outer jacket and the cladding comprises one of (i) the same specialty glass or (ii) different specialty glasses.

8. A method for manufacturing a microstructured optical fiber, comprising: providing a preform die in operative communication with a barrel of an extruder, the preform die comprising at least an inlet in a first end of the preform die for receiving softened glass from the barrel of the extruder, an outer portion having channels therein for directing the softened glass received from the barrel through the preform die, a center pin, a plurality of surrounding pins around the center pin and arranged in a desired periodic pattern, and an outlet in a second end of the preform die;

providing a specialty glass transmissive to light in the infra-red wavelengths above 2 μm and charging the same to the barrel of the extruder;

heating at least one of the barrel and the specialty glass to soften the glass and forcing the softened glass from the barrel through the inlet and into the outer portion of the preform die;

allowing the softened glass to flow through the channels of the preform die and around the center pin and the plurality of surrounding pins;

extruding a preform comprising at least an inner core corresponding to the center pin of the preform die, and a cladding around the core, the cladding including a plurality of air holes corresponding to the plurality of surrounding pins of the preform die and arranged in the periodic pattern of the pins in the preform die, each air hole comprising a longitudinal opening extending through the entire length of the preform, the preform being substantially free of interfacial and interstitial voids; and placing the extruded preform into a draw tower and drawing the preform into the microstructured optical fiber, wherein the fiber has a smaller dimension than the extruded preform and retains the periodic pattern of the preform.

9. The method of claim 8, wherein the microstructured optical fiber is a hollow core photonic band gap fiber.

10. The method of claim 8, wherein the fiber is suitable for transmitting light energy having a wavelength of at least 2 μm, and wherein the exact wavelength transmitted is determined by the periodic pattern of the air holes in the fiber.

11. The method according to claim 8, wherein the specialty glass is a non-silica glass selected from the group consisting of a chalcogenide glass, a chalcohalide glass, an oxide glass comprising specialty silicates, germanates, phosphates, borates, gallates, tellurites, and antimonates, and mixtures thereof.

* * * * *